Dec. 6, 1932.    R. J. McLEOD    1,890,399
METAL MILLING MACHINE
Filed Nov. 29, 1930    3 Sheets-Sheet 1

Inventor
Robert J. McLeod
by Wilkinson & Mawhinney
Attorneys.

Dec. 6, 1932.  R. J. McLEOD  1,890,399
METAL MILLING MACHINE
Filed Nov. 29, 1930  3 Sheets-Sheet 2

Inventor
Robert J. McLeod
by Wilkinson & Mawhinney
Attorneys.

Dec. 6, 1932.                R. J. McLEOD                1,890,399
                         METAL MILLING MACHINE
                         Filed Nov. 29, 1930        3 Sheets-Sheet 3
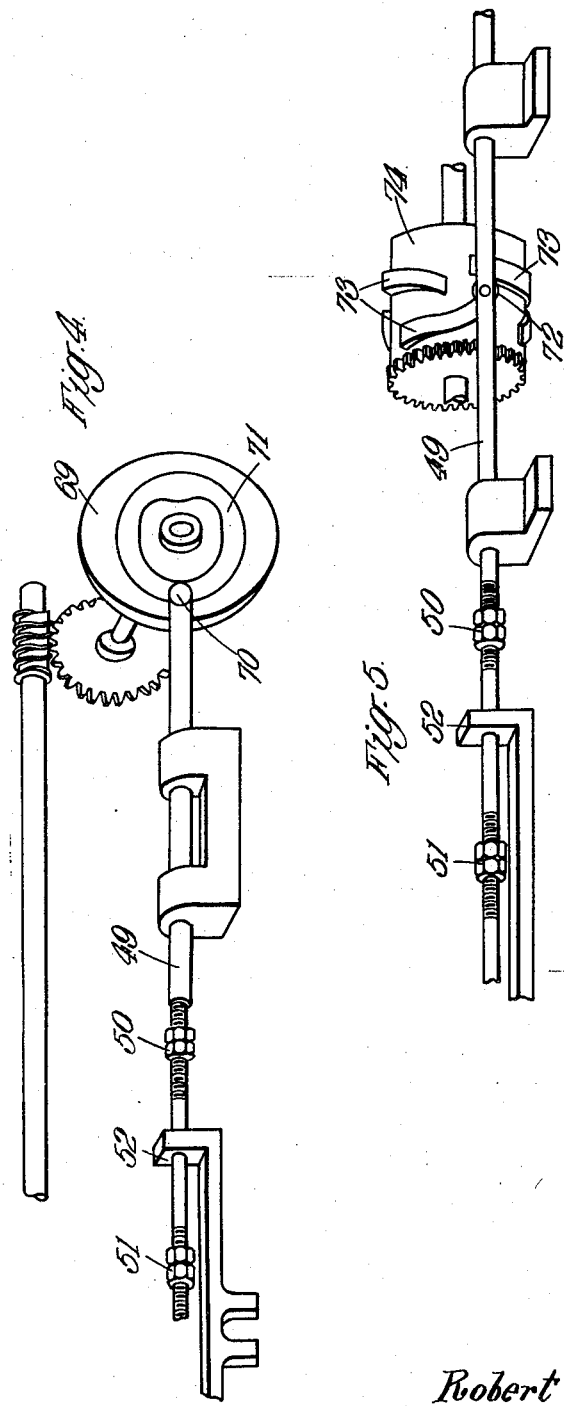
Inventor
Robert J. McLeod
by Wilkinson & Mawhinney
Attorneys.

Patented Dec. 6, 1932

1,890,399

UNITED STATES PATENT OFFICE

ROBERT JAMES McLEOD, OF WEST DRAYTON, MIDDLESEX, ENGLAND

METAL MILLING MACHINE

Application filed November 29, 1930, Serial No. 499,074, and in Great Britain December 4, 1929.

This invention relates to machines, such as thread cutting machines, using milling cutters or hobs, in which the tool and the work normally rotate at constant speeds, but at certain stages of the operation the relative velocity of the tool and work is varied by suitable gearing and a corresponding relative longitudinal traverse imparted to the tool relatively to the work.

In such machines it is sometimes desirable to have a predetermined starting point on the circumference and also on the axial length of the work for the purpose of forming a screwthread, scroll, gear tooth or shaped contour so that each succeeding product is exactly alike in this respect. Many instances occur where such a condition is of great advantage, in particular where in two parts to be screwed together, it is necessary for the male and female parts, when assembled, to be in certain definite relative positions, or where it is desired to mill a continuation of an existing thread, as in the case of double tapered sockets for pipe lines. In gears it is sometimes necessary for the teeth to be in a definite relationship to a crank, cam or other device as in calculating machines, totalizators, timing devices and the like.

The present invention consists in means for automatically restoring the tool to a predetermined axial and angular position relatively to the work.

In my specification Serial No. 309,777, I have described a thread milling machine for milling screw threads by means of hobs and the like, in particular where the hob, provided with a screw thread of the same pitch as the work, is rotated by differential gear and connected by suitable gearing to a lead screw, so arranged as to give an axial traverse to the hob in dependence on the acceleration or retardation of the hob in relation to the work.

In the present invention, in which a similar differential mechanism and means for operating the lead screw are employed, the hob or cutter may have any predetermined speed of rotation relative to that of the work.

To fulfill the conditions required it is necessary for the cutters to commence the cut at a point precisely defined with respect to the periphery and also to the axial length of the work to enable the cutting action to be repeated on the same piece of work or on similar pieces.

In the case of hobs of screw form, it is also necessary that a definite point on the periphery of the hob should coincide with a particular point on the work.

To carry out this invention, I provide an automatic reverse motion, whereby, after the work is completed or partially finished, by withdrawing the hob and its saddle clear of the work, a clutch is engaged which brings the reversing gear into action, reversing the differential gear and also the lead screw. The reversal of motion of the differential gear and lead screw will restore them to their respective original positions, although the hob saddle may have been decoupled from the lead screw. When, therefore, any are restored to their original positions, the reverse motion must be instantly declutched and all further motion arrested.

To effect this declutching and arrest, I arrange a cam or cylinder fitted with adjustable stops, which engage with a lever operating a trip device for disengaging the clutch. When the adjustable stop engages the lever and moves it sufficiently to release the trip, all motion of the cam or cylinder will be arrested.

As the cam or cylinder is driven from some convenient point in the train of gearing between the differential gear and lead screw, when the cam or cylinder is arrested, the movement of the differential gear and lead screw is also arrested.

The hob or cutter will continue to rotate with the work spindle, whilst the reverse motion is in action, with the acceleration or retardation due to the differential gear. When the hob is restored to its original position and the reverse motion arrested, every point on the hob will have its counterpart on the circumference of the work exactly as on the original piece of work.

The lead screw being also returned to its original position if the hob saddle is slid up to an adjustable dead stop, set to mark the original axial position, the split nut or the like can be engaged with the lead screw and all the required conditions will be met.

The hob or cutter slide which engages with the lead screw by means of the nut, may be decoupled and slid out of the way whilst the reverse motion is in action, so that other processes may be effected.

It is necessary, however, in the case of hobs of screw formation to ensure their correct position being regained, that the hob or its spindle should continue to revolve in constant relationship to the main spindle of the machine and the differential gear.

The invention will be described with reference to the accompanying drawings which have particular application to the screwing of threads by means of hobs.

Figs. 4 and 5 show modifications of the device for actuating the reverse clutch.

Figure 1:
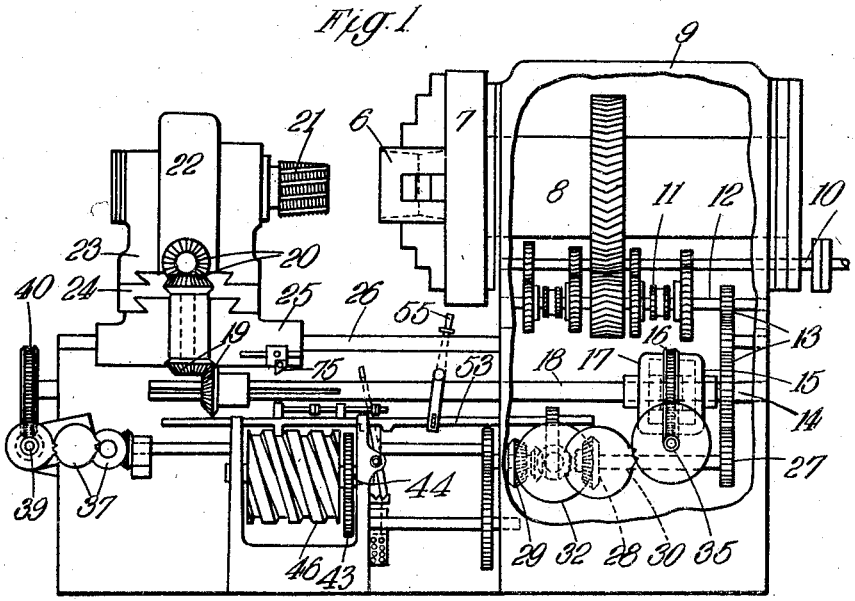
Fig. 1 is a front elevation of the machine.
Figure 2:
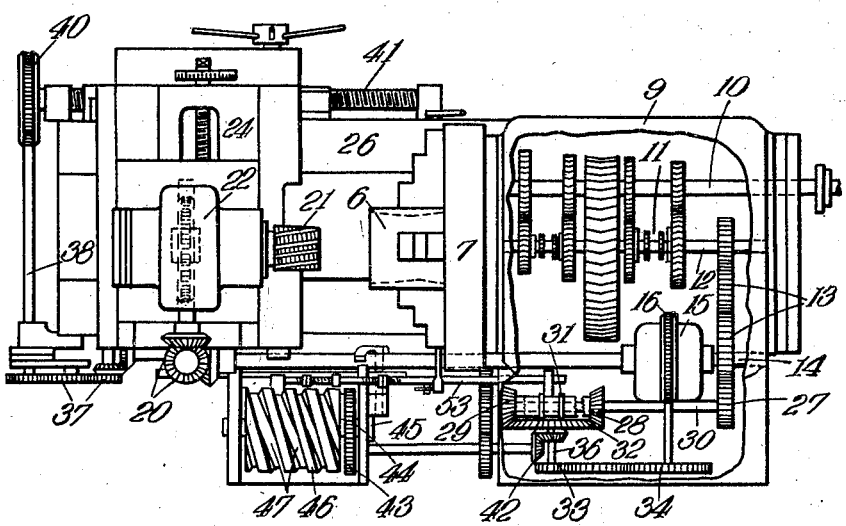
Fig. 2 is a plan.

Referring to Figs. 1 and 2, 6 is the work to be screwed, shown as a double tapered socket, mounted in a chuck 7 on a spindle 8 in a housing 9. The spindle 8 is driven from the main driving spindle 10 by a change speed and reversing gearing of well-known type represented generally by the reference 11.

Gearing 13 driven from the spindle 12 of the change speed gearing 11 drives a shaft 14 on the input side of a differential mechanism 15 of well-known type comprising a worm wheel 16 rigidly connected to a cage 17 carrying planet wheels; the output side of the cage is connected to a spindle 18 which, by bevel wheel trains 19 and 20, rotates the hob 21 mounted in the housing 22.

The hob is mounted on a saddle 23, cross slide 24 and longitudinal slide 25 on the bed 26.

A gear wheel 27 driven from the gear wheels 13 by gear wheels 27' (Fig. 3), operates a reversing gear comprising bevel pinions 28, 29 loosely mounted on the spindle 30 of the wheel 27 and a clutch 31 by which either of the pinions 28 or 29 can be brought into engagement with the spindle 30 and rotate in the one or other direction a gear wheel 32 connected by transmission gearing 33, 34 to a worm 35 gearing with the worm wheel 16 of the differential mechanism. An acceleration or retardation can, accordingly, be imparted to the hob 21 relatively to the work 6 in dependence on the position of the clutch 31.

Figure 3:
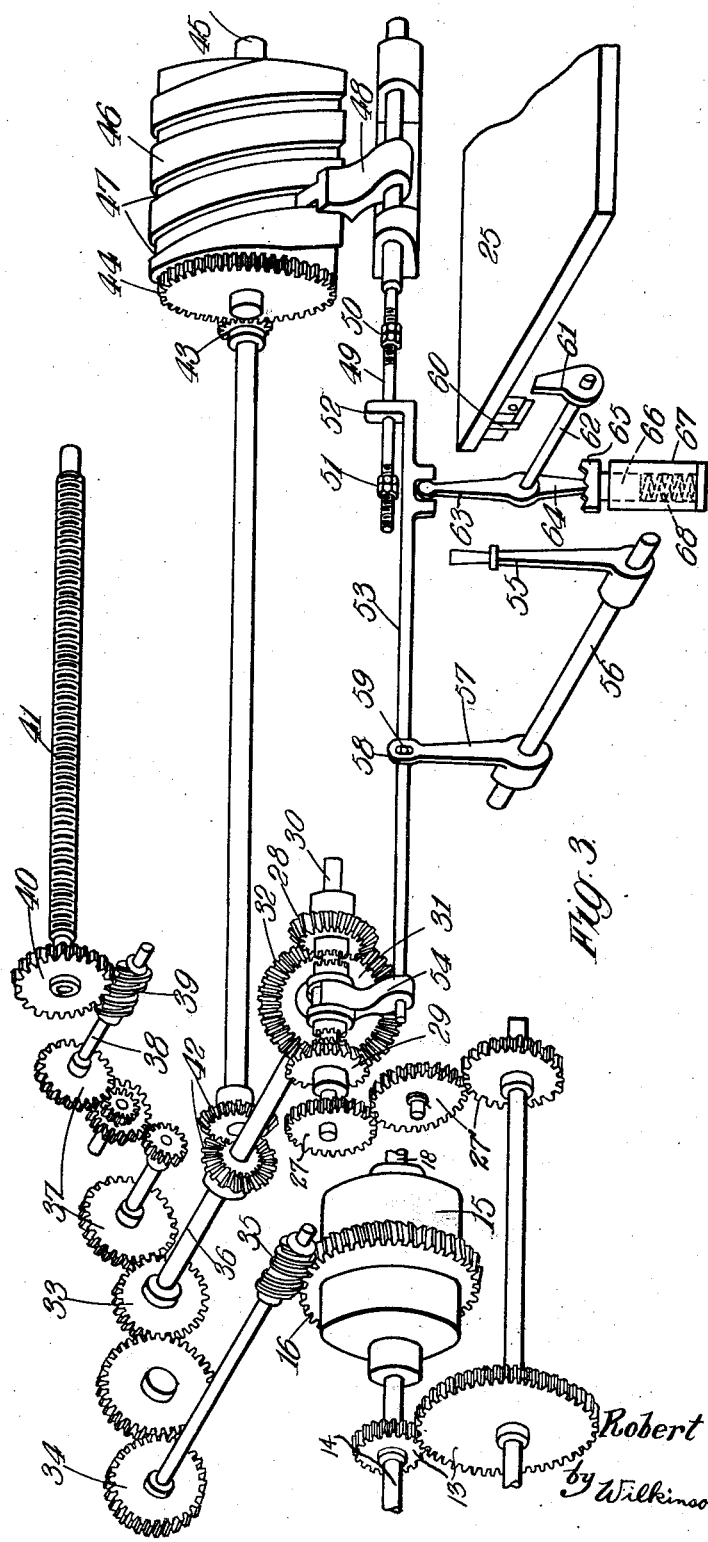
Fig. 3 is a partly isometric diagram in which gearing connecting some of the parts is represented somewhat diagrammatically on a larger scale in order that the action of the train of gears may be shown more clearly.

The shaft 36 of the wheel 32 is also connected by transmission gearing shown in Figs. 1, 2 and 3 under the reference 37 to the shaft 38 of a worm 39 gearing with a worm wheel 40 operating the lead screw 41 imparting a longitudinal movement to the slide 25 by means of the usual split nut or other equivalent device. By this means the hob is moved longitudinally in dependence on the differential rotation imparted to the hob relatively to the work.

Fig. 3 shows the gearing somewhat diagrammatically, with the parts slightly displaced from the actual positions so that the mechanism can be followed more easily.

The mechanism so far described is similar to that described in my specification Serial No. 309,777 and is not claimed in the present application.

The shaft 36 of the wheel 32 is also connected by bevel wheels 42 and transmission wheels 43, 44 to the shaft 45 of a cylinder 46. The wheel 44 is adjustably connected to the cylinder 46 in order that the cylinder can be set to a definite position in relation to the rest of the mechanism.

The cylinder 46 is provided with spiral grooves 47 in which a dog 48 rigidly secured to a sliding shaft 49 engages, so that the dog slides the shaft axially in the one or other direction according to the direction of rotation imparted to the cylinder by the reversing clutch 31.

Adjustable stops 50 and 51 on the sliding shaft 49 abut, respectively, against a lug 52 on a sliding bar 53 on which is secured the arm 54 of the clutch 31, as shown more clearly in Fig. 3. The stops are adjusted so that when they abut against the lug 52 they move the bar 53 and with it the clutch 31 to the disengaged position in which neither of the pinions 28 or 29 is in engagement with the gear wheel 32 and, consequently, the differential gear is not actuated, the lead screw is not operated and no differential movement is imparted to the hob 21.

The clutch 31 can also be operated by a hand lever 55 on a rock shaft 56 to which is attached an arm 57, the forked slotted end 58 of which engages a pin 59 on the spindle 53.

A stop 60 is adjusted on the longitudinal slide 25, so that when the work has been completed and the hob 21 has been withdrawn from the work by hand, the stop encounters an arm 61 on a rock shaft 62 of a trip device which is rotated through an angle such, that a lever arm 63 on the shaft moves the sliding bar 53 to actuate the clutch 31 so as to reverse the direction of rotation of the lead screw, differential mechanism and cylinder 46.

In the normal position of the rock shaft 62, a lower extension 64 of the lever arm 63 engages in teeth provided in the head 65 of a small plunger 66 displaceable vertically in a tubular casing 67 under the action of a spring 68 which is compressed by the movement of the arm 64 as it rides up the inclined surfaces of the teeth.

In Fig. 4, a cam disc 69 replaces the grooved cylinder 46. A pin 70 on the sliding bar 49 engages in a suitably shaped groove 71 in the cam disc and, as the cam revolves, displaces the bar 53 longitudinally.

The same result is obtained by the modification shown in Fig. 5, in which a small roller 72, pinned on the bar 49 and engaged by curved strips 73 on the periphery of the cylinder 74, effects the required longitudinal movements of the bar 53.

The action of the machine is as follows:—

It is assumed that the outer portion of the double tapered socket 6 is to be screw-threaded, the thread having been already formed on the inner portion adjacent to the chuck, and that the thread on the outer portion must be a continuation of the existing thread.

The gear ratios are set to impart a longitudinal traverse to the hub 21 in dependence on the acceleration or retardation imparted to the hob by the differential mechanism 15; the longitudinal slide 25 is traversed by hand until the hob is in position to continue the thread already formed. The stop 50 is set to this position and a stop 75 on the slide limits the movement in this direction.

In this position the differential gear is disconnected from the tool and the lead screw, and the tool and work can be rotated from the shaft 10 at the required speeds and the cutting effected at the required position of the work.

When it is desired to bring into operation the differential movement and the relative traverse, the hand lever 55 is pulled over to engage the clutch 31 in the desired direction, so that, for example, the pinion 29 is in gear with the wheel 32, and the cylinder 46 rotates in the direction to move the dog 48 and bar 49 to the right until the stop 51 engages with the lug 52 and brings the clutch 31 into the disengaged position in which the differential mechanism and traversing gear are out of action. The tool and work are now rotating at the original speeds, but no acceleration or retardation is imparted to the tool relatively to the work and there is no longitudinal traverse of the tool.

The longitudinal slide 25 can be withdrawn by hand clear of the work until the stop 60 operates the lever arm 63 and the clutch 31 to reverse the direction of rotation of the differential mechanism, lead screw and cylinder 46, until the stop 50 again brings the clutch into the disengaged position.

The hob 21 and the lead screw 41 are now restored to their original starting positions, and if at the commencement of the operation a centre line were drawn through the housing 22 and a second line parallel to the former from a point on the periphery of the hob, at the end of each reversal these lines would be in the same relative positions and the cutting operations can be repeated with the required accuracy.

The invention can be used with any form of hob or milling cutter and is adapted either for repetition work or for repeating the cut on the same work.

I claim:—

1. In a machine for effecting milling operations, such as thread cutting by hobs, in which the tool and the work normally rotate at constant speeds, but at certain stages of the operation the relative velocity of the tool and work is varied by suitable gearing and a corresponding longitudinal traverse is imparted to the tool, means, for the purpose described, for automatically restoring the tool to a predetermined axial and angular position relatively to the work, a saddle on which the tool is mounted, differential mechanism by which the speed or rotation of the tool can be adjusted relatively to that of the work, a sliding clutch and gears connectible to said clutch for operating said differential mechanism and said traversing movements of the saddle, the said clutch having a central neutral position and two end positions for rotating said differential mechanism, respectively, in opposite directions, a cylinder rotated by the gearing operating said differential mechanism, inclined surfaces on said cylinder, a slidable rod, a member secured to said rod and engaging with said inclined surfaces, stops on said rod, a second slidable rod connected to said clutch and a lug thereon adapted to engage with said stops in the limiting positions of the tool to move said clutch into the neutral position when the tool is at either of its limiting positions.

2. In a machine for effecting milling operations, such as thread cutting by hobs, in which the tool and the work normally rotate at constant speeds, but at certain stages of the operation the relative velocity of the tool and work is varied by suitable gearing and a corresponding longitudinal traverse is imparted to the tool, means, for the purpose described, for automatically restoring the tool to a predetermined axial and angular position relatively to the work, a saddle on which the tool is mounted, differential mechanism by which the speed of rotation of the tool can be adjusted relatively to that of the work, a sliding clutch and gears connectible to said clutch for operating said differential mechanism and said traversing movements of the saddle, the said clutch having a central neutral position and two end positions for rotating said differential mechanism, respectively, in opposite directions, a cylinder rotated by the gearing operating said differential mechanism, inclined grooves on said cylinder, a slidable rod, a dog secured to said rod and engaging with said inclined grooves, stops on said rod, a second slidable rod connected to said clutch and a lug thereon adapted to engage with said stops in the limiting positions of the tool to move said clutch into the neutral position when the tool is at either of its limiting positions.

In testimony whereof I have signed my name to this specification.

ROBERT JAMES McLEOD.